United States Patent [19]

Inagami

[11] Patent Number: 5,058,203
[45] Date of Patent: Oct. 15, 1991

[54] MOBILE TELEPHONE TERMINAL HAVING SELECTIVELY USED PROCESSOR UNIT FOR LOW POWER CONSUMPTION

[75] Inventor: Fujio Inagami, Yokohama, Japan

[73] Assignee: Fujitsu Limited, Kawasaki, Japan

[21] Appl. No.: 354,989

[22] Filed: May 22, 1989

[30] Foreign Application Priority Data

May 21, 1988 [JP] Japan ................... 63-123006

[51] Int. Cl.⁵ ............ H04B 1/38; H04B 1/16
[52] U.S. Cl. ................... 455/89; 455/343; 379/61
[58] Field of Search ............ 455/343, 89–90, 455/127; 379/61, 63; 320/31–32; 340/311.1, 825.44, 825.48

[56] References Cited

U.S. PATENT DOCUMENTS

| 4,380,832 | 4/1983 | Nagata et al. ............ 455/343 |
| 4,384,361 | 5/1983 | Masaki ................ 455/343 |
| 4,437,095 | 3/1984 | Akahori et al. ........... 455/343 |
| 4,562,307 | 12/1985 | Bursztejin et al. ........... 379/61 |

FOREIGN PATENT DOCUMENTS 60-065317 4/1985 Japan .
0232531 9/1988 Japan ................. 455/343

Primary Examiner—Reinhard J. Eisenzopf
Assistant Examiner—Andrew Faile
Attorney, Agent, or Firm—Staas & Halsey

[57] ABSTRACT

A mobile telephone terminal powered by a battery, which terminal is mainly comprised of a processor unit and a logic LSI unit as a control part thereof. The processor unit handles first control functions which are not used frequently but which are complicated and operate at a high clock speed. The logic LSI unit handles second control functions which are used constantly and frequently at a low clock speed. The processor unit is activated intermittently on demand by the logic LSI unit and thereby reduces power consumption.

18 Claims, 11 Drawing Sheets

MOBILE TELEPHONE TERMINAL HAVING SELECTIVELY USED PROCESSOR UNIT FOR LOW POWER CONSUMPTION

BACKGROUND OF THE INVENTION

1. Field of the Invention

The present invention relates to a mobile telephone terminal which is driven by a battery, particularly a mobile telephone terminal which can considerably reduce power consumption in order to extend the life of the battery.

The mobile telephone terminal of the present invention can be applied to variety of mobile telephone terminals operated under a cellular system, such as a land mobile radio telephone, a shoulder type radio telephone, a portable type radio telephone and so on. The land mobile radio telephone and shoulder type radio telephone are substantially the same belonging to class I, producing a transmitting power of, for example, 3 W. The portable type radio telephone belongs to class III producing a transmitting power of, for example, 0.6 W.

2. Description of the Related Art

Especially, in the technical field of a battery feed type mobile telephone terminal, it is desired to reduce power consumption as much as possible to extend the life of the battery.

In general, a mobile telephone terminal is constructed to use a microcomputer. This is because, the mobile telephone terminal requires a variety of complicated processes to be carried out therein. Further, it is preferable to use a microcomputer from the viewpoints of convenience in constructing the mobile telephone system, economy in building the system, and minimizing the scale thereof.

As for the microcomputer, usually an 8 bit main central processing unit (CPU) and a 4 bit sub CPU are used. The main CPU handles terminal control, data reception processing, data transmission processing, timer management and so on. On the other hand, the sub CPU handles man-machine communication processes, such as a process of driving a display mounted on the mobile telephone terminal, a process of an operating of keys which are also mounted thereon. Further, the mobile telephone terminal requires, other than the above, base band processing, transmitting and receiving processing, and the like.

As mentioned first, in the battery feed type mobile telephone terminal, it is desired to reduce power consumption as much as possible. For this, the circuits for constructing the mobile telephone terminal, including the above-mentioned main and sub CPU's, are realized by complementary metal-oxide-semiconductor (CMOS) devices. As known, the CMOS device is a low power consumption device.

The CMOS device is a low power consumption type device, but current flows therethrough every time an ON-OFF operation is performed therein, so that power supplied from the battery becomes large. As known, the frequency of the ON-OFF operations is proportional to an operating speed, or operating frequency of the CMOS device. Therefore, the power consumption is relatively large at the main CPU and memories, such as a read only memory (ROM) and a random access memory (RAM), cooperating with the main CPU, since the main CPU and the memories work at a relatively high operating frequency, for example, 1 MHz or 2 MHz.

Thus, a problem resides in that a large amount of power supplied from the battery is needed by the main CPU, ROM, and RAM as long as these are operated at a high operating frequency. This apparently shortens the life of the battery.

SUMMARY OF THE INVENTION

Accordingly, an object of the present invention is to provide a mobile telephone terminal which operates with lower power consumption than that of the conventional mobile telephone terminal.

To attain the above object, the mobile telephone terminal according to the present invention is constructed such that a processor unit, corresponding to the aforesaid main CPU, performs first control functions, and a logic large scale integration (LSI) unit, corresponding to the peripheral units of the main CPU, performs second control functions. The first control functions used in the mobile telephone terminal are not used frequently but are complicated and operate at a high frequency. While, the second control functions are used constantly and frequently with a low speed clock. Further, the processor unit performs the first control functions intermittently each time a function is needed to be performed.

Incidentally, the aforesaid first and second control functions have been both performed mainly by the processor unit (main CPU) and the memories (ROM, RAM).

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Figure 1:
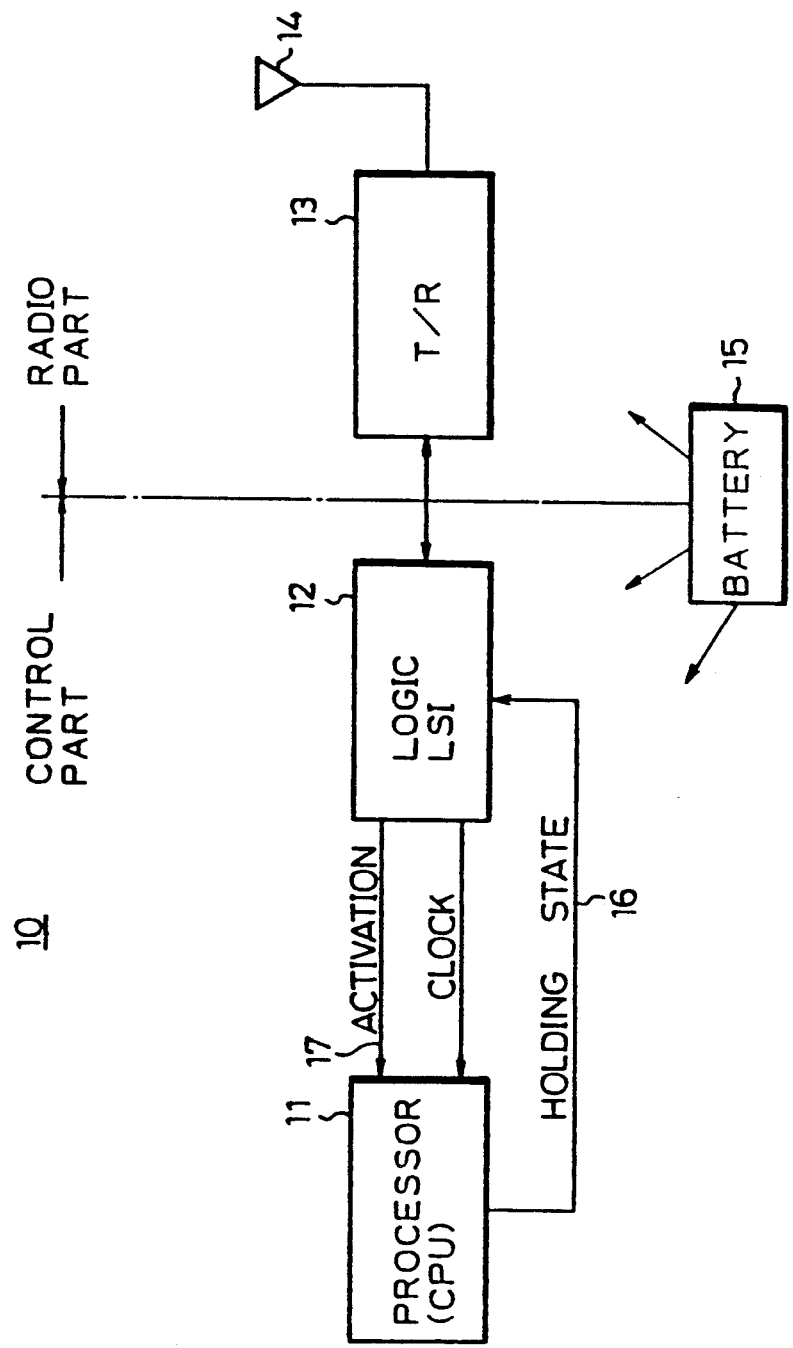
FIG. 1 is a block diagram showing principle construction of a mobile telephone terminal according to the present invention.

FIG. 1 is a block diagram showing principle construction of a mobile telephone terminal according to the present invention. A mobile telephone terminal 10 of FIG. 1 is primarily classified into two parts, i.e., a control part and a radio part. The radio part is mainly comprised of a transmitting and receiving (T/R) unit 13 provided with an antenna 14. The control part is mainly comprised of a processor unit (CPU) 11 and a logic LSI unit 12. All are driven by a battery 15. The present invention basically refers to the control part. The members in the control part, including the processor unit (CPU) 11 and the logic LSI unit 12, at least, perform a variety of control functions. The functions are classified into first control functions and second control functions.

The processor unit 11 is provided to process the first control functions, with the cooperation of memories, which functions are not used frequently but are complicated and operate at a high clock speed.

The logic LSI unit 12 is provided to process the second control functions which are used constantly and frequently with a low speed clock.

Further, the logic LSI unit 12 is operative to activate the processor unit 11 every time the first control functions need to be handled by providing the high speed clock (CLOCK) to the processor unit 11.

Figure 2:
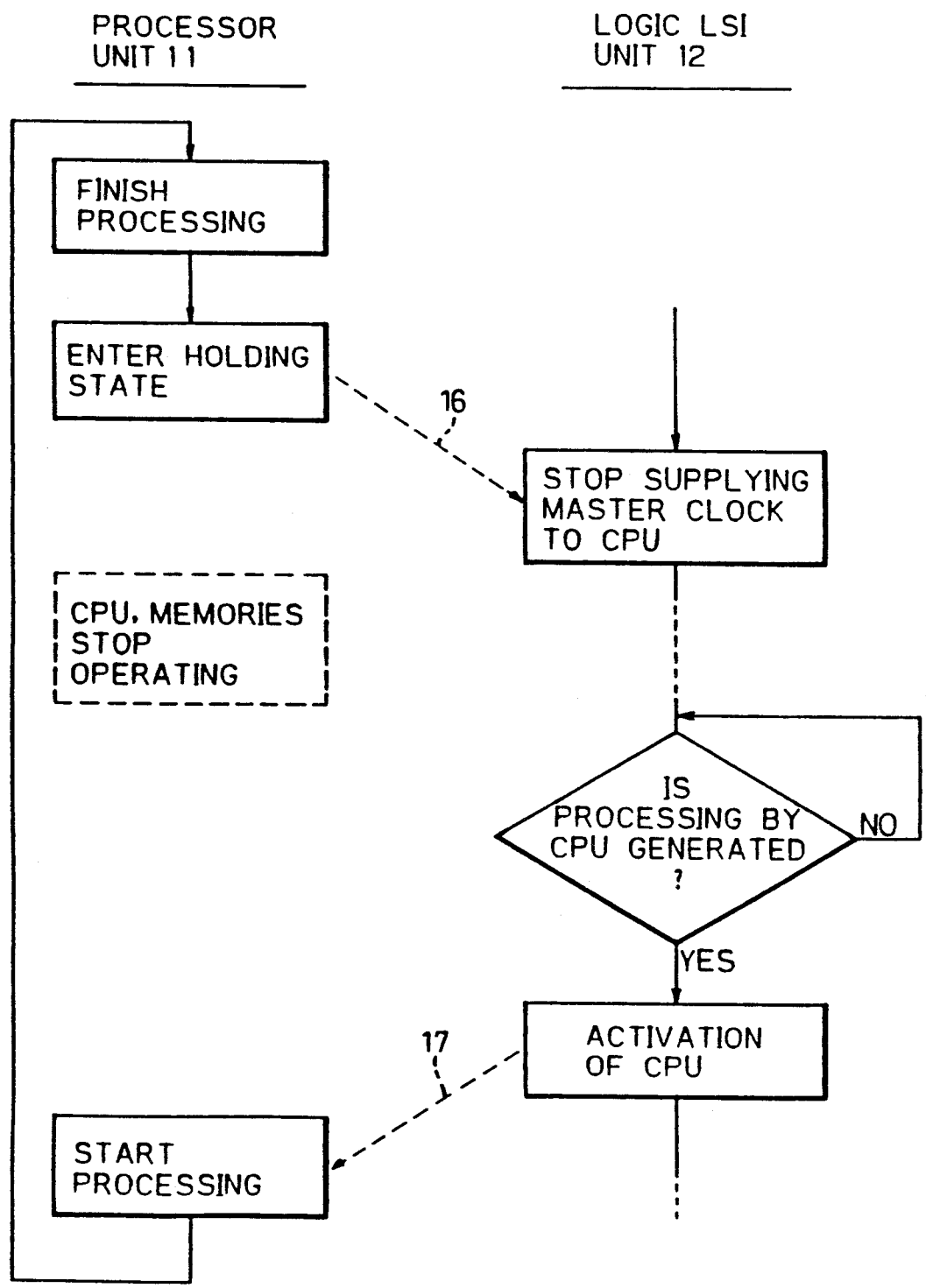
FIG. 2 depicts a schematic flow chart for explaining the operation according to the present invention.

FIG. 2 depicts a schematic flow chart for explaining the operation according to the present invention. The words "ACTIVATION", "CLOCK" and "HOLDING STATE", used in FIG. 1 will be clarified with reference to FIG. 2.

Referring to both FIGS. 2 and 1, suppose that the processor unit 11 finishes a certain process for performing the first control functions, which is expressed as "FINISH PROCESSING" shown at the top left of FIG. 2. The processor unit 11 then enters by itself into a holding state (refer to "ENTER HOLDING STATE" in FIG. 2). The holding state is notified from the processor unit (CPU) 11 to the logic LSI unit 12 via a line 16 (shown in FIGS. 1 and 2). The logic LSI unit 12 then operates to stop supplying a master clock (refer to "CLOCK" in FIG. 1) to the processor unit (CPU) 11. That is, no high speed clock is sent to the CPU 11 from the LSI 12. Soon after this, the CPU and the cooperating memories stop operating (refer to corresponding block in the column of the CPU 11 in FIG. 2).

Thus, the logic LSI unit 12 watches the status of the processor unit 11 and stops the supply of the high speed clock every time the logic LSI unit 12 detects that the processor unit 11 is in the holding state.

It should be noted here that the power consumption of the CPU 11 and the corresponding memories becomes very low due to the nature of the CMOS devices, after stoppage of the clock supplied to the CPU 11.

The logic LSI unit 12 continuously supervises whether a processing to be achieved by the processor unit (CPU) 11 is generated in the telephone terminal (refer to the step "IS PROCESSING BY CPU GENERATED?" in FIG. 2). If it is detected by the LSI 12 that the related processing is generated, then the processor unit (CPU) 11 is activated (refer to "ACTIVATION OF CPU" in FIG. 2 and line 17 in FIG. 1). At the same time, or preceding the activation of the CPU, the logic LSI unit 12 resupplies the high speed clock (master clock) (refer to "CLOCK" in FIG. 1) to the CPU 11. The CPU 11 then starts the related processing (refer to "START PROCESSING" in FIG. 2), which will finally end again at the step "FINISH PROCESSING". The above-mentioned "ACTIVATION" is triggered preferably by issuing an interrupt request to the CPU 11 from the LSI 12.

As understood from the above, the total power consumption in the mobile telephone terminal is greatly reduced, since the processor unit (CPU) 11 and the cooperating memories work intermittently, i.e., at a relatively low frequency, wherein the processor unit 11 and the memories usually operate at a high speed clock and thereby are high power consumption members.

Figure 3:
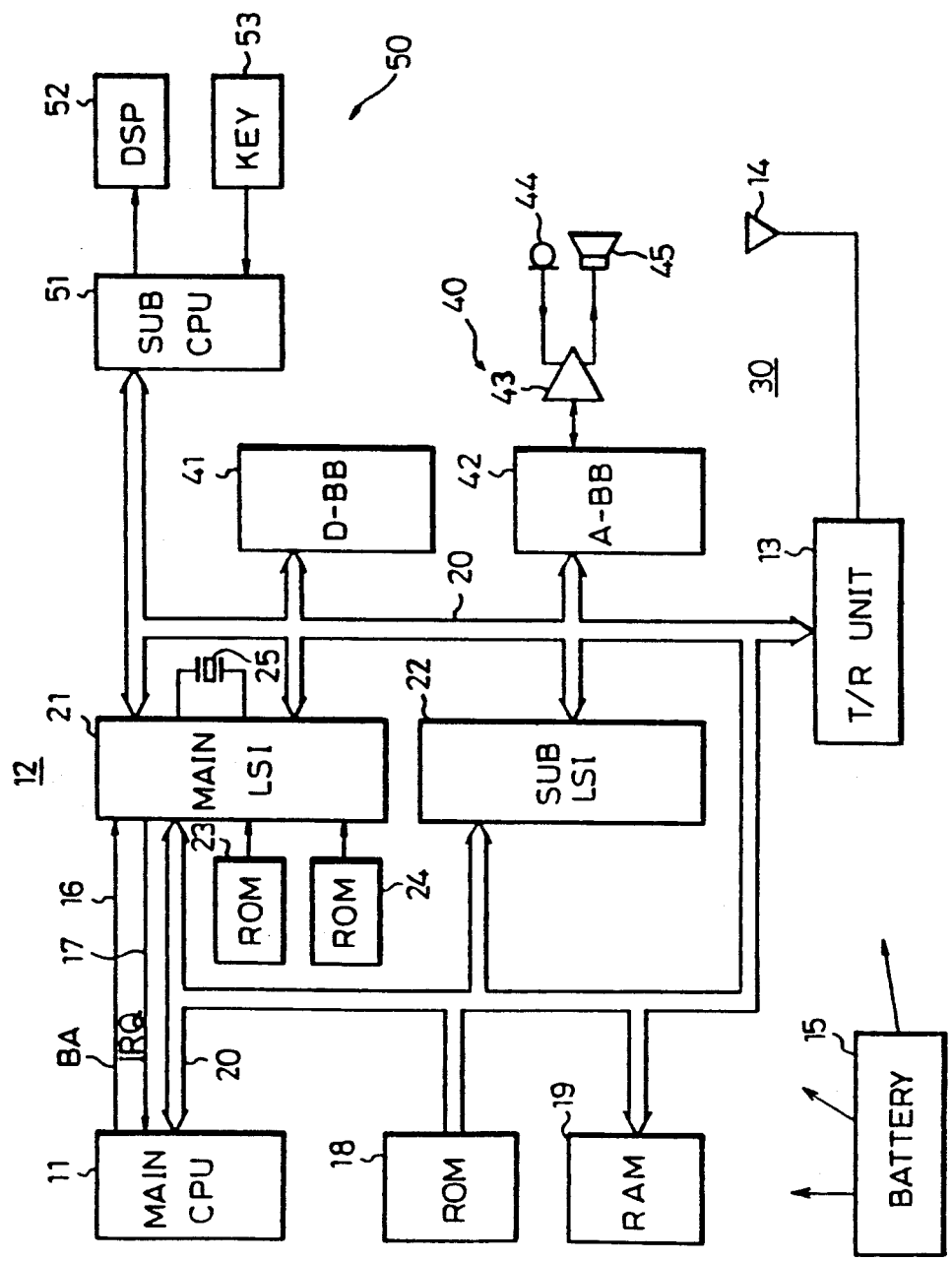
FIG. 3 is a block diagram showing an example of a mobile telephone terminal according to the present invention.

FIG. 3 is a block diagram showing an example of a mobile telephone terminal according to the present invention. In FIG. 3, reference numeral 11 represents the processor unit as shown in FIG. 1, which unit 11 is comprised of a main CPU having memories, i.e., ROM 18 and RAM 19 cooperating therewith. The main CPU 11 is, for example, an 8 bit microcomputer. The ROM 18 stores therein a program to operate the processor unit (main CPU) 11. The RAM 19 stores therein data for read and write operations. As will be understood later, the program in the ROM 18 should not be autonomous but subject to an external command issued from the logic LSI unit 12. Then CPU 11 and the memories operate at a frequency of, e.g., 1 MHz (or 2 MHz), which frequency is obtained by dividing in frequency the output signal from a master clock source 25 of 4 MHz (or 8 MHz).

The logic LSI unit 12 is, in FIG. 3, comprised of a main LSI 21 and a sub LSI 22 which are respectively provided with a memory (ROM) 23 and a memory (ROM) 24. The ROM 23 stores therein system information, for example, a telephone number allotted to this mobile telephone terminal and an area number of an area determined under a contract between a user and a dealer. The ROM 24 stores a serial number, for example, a production lot number of this mobile telephone terminal, which lot number is determined by its maker when making the mobile telephone number. It should be understood that the logic LSI unit 12 is divided into the main LSI 21 and the sub LSI 22 due merely to a factor in actual design. That is, even though it is possible to construct the logic LSI unit 12 using a single LSI, the number of pins provided by the single LSI chip becomes extremely large. This being so, it is convenient to construct the logic LSI unit 12 with two general purpose LSI chips 21 and 22.

The mobile telephone terminal has further members, other than the above recited members. Reference numeral 30 represents the aforesaid radio part, as in FIG. 1, comprising the transmitting and receiving (T/R) unit 13 and the antenna 14. Reference numeral 40 represents a base band part which is mainly comprised of a digital base band (D-BB) unit 41 and an analog base band (A-BB) unit 42. The analog base band unit 42 contains therein, for example, analog filters, and deals with analog voice signals. The voice signal is communicated through a microphone 44 and a speaker 45. A voice signal amplifier 43 is located therebetween.

Reference numeral 50 represents a man-machine interface part which is mainly comprised of a sub CPU 51 of, for example, a 4 bit type, a display (DSP) 52, and a key switch (KEY) 53. The display 52 acts as an indicator. The key switch 53 contains function keys, numeral buttons ("0" through "9"), volume switches, a send command button, an end indication button, and so on. All members are energized by the battery 15. For saving the power of the battery 15, major members, such as 11, 13, 18, 19, 21, 22, 23, 24, 41, 42, are fabricated using CMOS devices. The display 52, for example having a 16 digit construction, is comprised of, for example, a liquid crystal device which is, as is known, a low power consumption device.

The sub CPU 51 controls the display 52 and the key switch 53 periodically at 5 ms intervals. The man-machine interface part 50 is constructed exclusively, as in the prior art. The part 50 and also the parts 30 and 40 are identical to those of the prior art.

As mentioned above, the control functions performed in the control part, are shared by the logic LSI unit and the processor unit. This will further be clarified below.

Logic LSI unit 12

I. Data reception processing (a) Contents of the data reception processing

1) Data reception processing
The data reception rate is:
   10K Baud, when the Advance Movable Phone System (AMPS) is employed; and
   8K Baud, when the Total Access Communication System (TACS) is employed.

2) Decision by majority for words
Generally, the received data is composed of words repeated, for example, 5 times, so as to improve reliability of the data. In the example, a 3/5 majority is adopted. That is, if three normal bits among five bits that are located at the same position of each word are obtained, the non-normal bits can be corrected.

3) Error correction of received data
Generally, a Bose-Chaudhuri-Hocqueghem (BCH) code is utilized for the error correction of data.

4) Decision by majority for B/I bit
A busy/idle (B/I) bit is periodically monitored in the mobile telephone terminal so as to perform duplex communication. In the example, a ⅔ majority is adopted. That is, if two normal B/I bits among last three B/I bits of receiving data are obtained, the B/I state can be determined by noting the majority.

5) B/I bit processing
In the processing, it is checked whether it is possible to send data to the land station.

(b) Operation timing
The logic LSI unit 12 operates at each interrupt sent at 100 μs intervals to the processor unit 11.

(II) High speed timer management (a) Contents of the management
Many functions are achieved at respective prescribed timings which are controlled by timers.

1) For example, if three kinds of timers are managed, each of the timers has a resolution of 1 ms.

2) As another example, if seven kinds of timers are managed, each of the timers has a resolution of 10 ms.

(b) Operation timing
The logic LSI unit 12 operates at 1 ms intervals.

To be specific, in FIG. 3, the main LSI 21 handles the above-recited data reception processing, while the sub LSI 22 handles the above-recited high speed timer management.

Main CPU 11

(I) Terminal control
A call origination, a call termination, and a registration of the location of the mobile telephone terminal are subjected to terminal control.

(II) Data transmission processing (a) Contents of the processing
The data to be transmitted from the mobile telephone terminal is processed by the main CPU 11.

(b) Operation timing
The operation is started any time the data transmission is required.

(III) Low speed timer management (a) Contents of the management
As mentioned before, many functions are achieved at respective prescribed timings which are controlled by timers.

1) For example, if six kinds of timers are managed, each of the timers has a resolution of 50 ms.

2) As another example, if three kinds of timers are managed, each of the timers has a resolution of 2 seconds.

(b) Operation timing
The main CPU is operated by receiving an interrupt given every 50 ms. To be specific, the related interrupt request is generated in the sub LSI 22.

Referring again to FIG. 3, the received signal is input to the mobile telephone terminal by way of the antenna 14 and the transmitting and receiving unit (T/R) 13. The received signal is first supplied to the analog base band (A-BB) unit 42 in which a filtering operation is applied to the received signal. The thus filtered signal is supplied, via the bus 20, to the digital base band (D-BB) unit 41. The data from the unit 41 is applied to the main LSI 21. As mentioned previously, the main LSI 21 and sub LSI 22 cooperate together.

The main CPU 11 is operated on demand according to an activation by the logic LSI unit 12. When the main CPU 11 is operated, the ROM 18 and the RAM 19 also start operating in accordance with an access thereto by the CPU 11.

The data to be transmitted from the CPU 11 is transferred along a path opposite to the one mentioned above. That is, the transmission data is transferred from the CPU 11 to the antenna 14 through the main LSI 21, the digital base band unit 41, the analog base band unit 42 and the transmitting and receiving unit 13.

The logic LSI unit 12 watches a logic level on a bus available (BA) signal line 16 which is connected between the logic LSI unit 12 and the processor unit (main CPU) 11 and, when the logic level on the BA signal line 16 assumes first logic level, e.g., logic "H" (high), the logic LSI unit 12 detects that the processor unit 11 is in the holding state. The logic "H" on the line 16 is produced by executing a "Wait for interrupt" instruction. In this case, the processor unit 11 enters by itself into said holding state by an execution therein of the "Wait for Interrupt" instruction generated for each process when the aforesaid first control functions are finished.

Thus, the main LSI 21 supplies the master clock from the master clock source 25 or stops supplying the same according to logic "L" (low) or "H" of the signal BA (bus available) on the line 16 (a line for transferring the master clock is not illustrated in FIG. 3). The master clock is supplied together with an issuance of the interrupt request (IRQ). The logic LSI unit 12 issues the interrupt request IRQ relating to the aforesaid "Wait for Interrupt" instruction to the processor unit 11, every time an interrupt (IRQ-R) occurs in the logic LSI unit 12, each of which interrupts require an activation of the processor unit (main CPU) 11.

Figure 4:
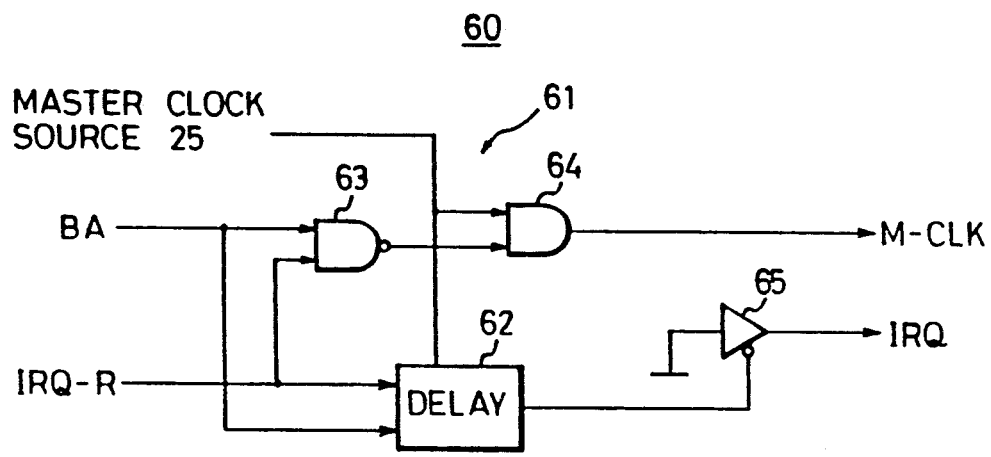
FIG. 4 is a brief circuit diagram of an example of a timing control circuit.

FIG. 4 is a brief circuit diagram of an example of a timing control circuit. The timing control circuit 60 is mounted in the logic LSI unit 12 and produces the aforesaid master clock M-CLK and the interrupt request IRQ sent to the processor unit (main CPU) 11 according to the input signals, i.e., the signal BA and the interrupt IRQ-R.

Figure 5:
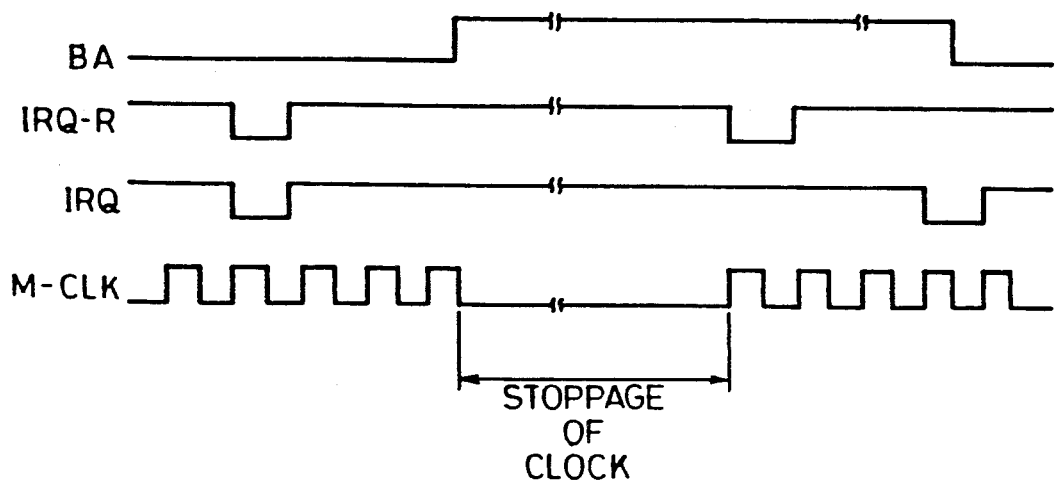
FIG. 5 depicts a timing chart for explaining the circuit of FIG. 4.

FIG. 5 depicts a timing chart for explaining the circuit of FIG. 4. The operation of the timing control circuit 60 will be explained below with reference to FIG. 5. The interrupt request IRQ is issued immediately after the occurrence of any one of the interrupts IRQ-R when the related interrupt occurs during a condition where the logic level on the BA signal line 16 assumes a second logic level, e.g., "L", which indicates that the processor unit (main CPU) 11 is not in the holding state but in the operating state. The interrupt request IRQ is issued after a predetermined delay time from the occurrence of anyone of the interrupts IRQ-R when the related interrupt IRQ-R occurs during the holding state where the logic level on said BA signal line 16 assumes the first logic level, e.g., "H".

The aforesaid predetermined delay time is a time required for preparation of the high speed clock (1 MHz or 2 MHz) which can normally drive the processor unit 11.

The high speed clock is obtained by dividing in frequency the master clock M-CLK from the logic LSI unit 12, at the source 25.

The logic LSI unit 12 contains therein a delay means 62 which provides a delay conforming to the preparation of the high speed clock which is lower than the speed of said master clock M-CLK (4 MHz or 8 MHz) produced by the master clock source 25 provided by the logic LSI unit 12.

The master clock M-CLK is given to the processor unit 11 via a first logic means 61 which receives two inputs, one of which is the logic level on the BA signal line 16, and the other of which is the interrupt IRQ-R.

The first logic means 61 operates to produce the master clock M-CLK, regardless of an existence of the interrupt IRQ-R ("L"), when the logic level on the BA signal line 16 assumes the second logic level, e.g., "L". The first logic means 61 operates to start producing the master clock M-CLK, when at the occurrence of the interrupt IRQ-R ("L") during a condition where the logic level on the BA signal line 16 assumes the first logic level ("H"), i.e., during the holding state.

The interrupt request IRQ is issued to the processor unit 11 via a second logic means (delay means) 62 which receives two inputs, one of which is the logic level on the BA signal line 16, and the other of which is the interrupt IRQ-R.

The second logic means 62 operates to produce the interrupt request IRQ immediately after the reception of the interrupt IRQ-R, when the logic level on the BA signal line 16 assumes the second logic level, e.g., "L", and produces the interrupt request IRQ after the aforesaid predetermined delay time, when the logic level on the BA signal line 16 assumes the first logic level, e.g., "H".

In the first logic means 61, when the signal BA assumes a logic level "L", and at the same, the interrupt IRQ-R is generated in the logic LSI unit 12, a NAND gate 63 produces an output of logic level "H". Therefore, the master clock M-CLK is supplied from the clock source 25 to the processor unit (main CPU) 11 via an AND gate 64. The interrupt request IRQ is sent to the processor unit 11, in response to the interrupt IRQ-R, via the second logic means, i.e., delay means 62, and a buffer gate 65. The processor unit 11 is then activated and starts operating at the speed of, for example, 1 MHz or 2 MHz. That is, the main CPU 11 divides in frequency the received master clock M-CLK (4 MHz or 8 MHz).

When the BA signal assumes an "H" level, the master clock M-CLK is stopped. The main CPU 11 is then stopped from operating, as are the ROM 18 and the RAM 19.

When the BA signal assumes an "H" level, and at the same time, the interrupt IRQ-R is generated in the logic LSI unit 12, the interrupt request IRQ is issued after an elapse of a predetermined time from the generation of the interrupt IRQ-R. The reason why the IRQ is issued after a certain elapse of time is that, if the BA signal assumes a logic level "L", the main CPU 11 is under operation (in an operating state), and therefore the main CPU 11 can be immediately responsive to the IRQ. However, if the BA signal assumes a logic "H", the main CPU 11 is in the holding state, and therefore, a certain delay time is necessary before an actual generation of the clock which drives the main CPU 11. The delay time is created by the delay means 62. According to FIG. 5, the delay time corresponds to four pulses of the master clock M-CLK, the first pulse rises at the second change of the IRQ-R. As mentioned before, in this embodiment, the clock used in the main CPU 11 has a frequency of 1 MHz (or 2 MHz) which is obtained by dividing the M-CLK of 4 MHz (or 8 MHz), by "4". Thus, the aforesaid four pulses of the M-CLK correspond to the delay time.

Figure 6:
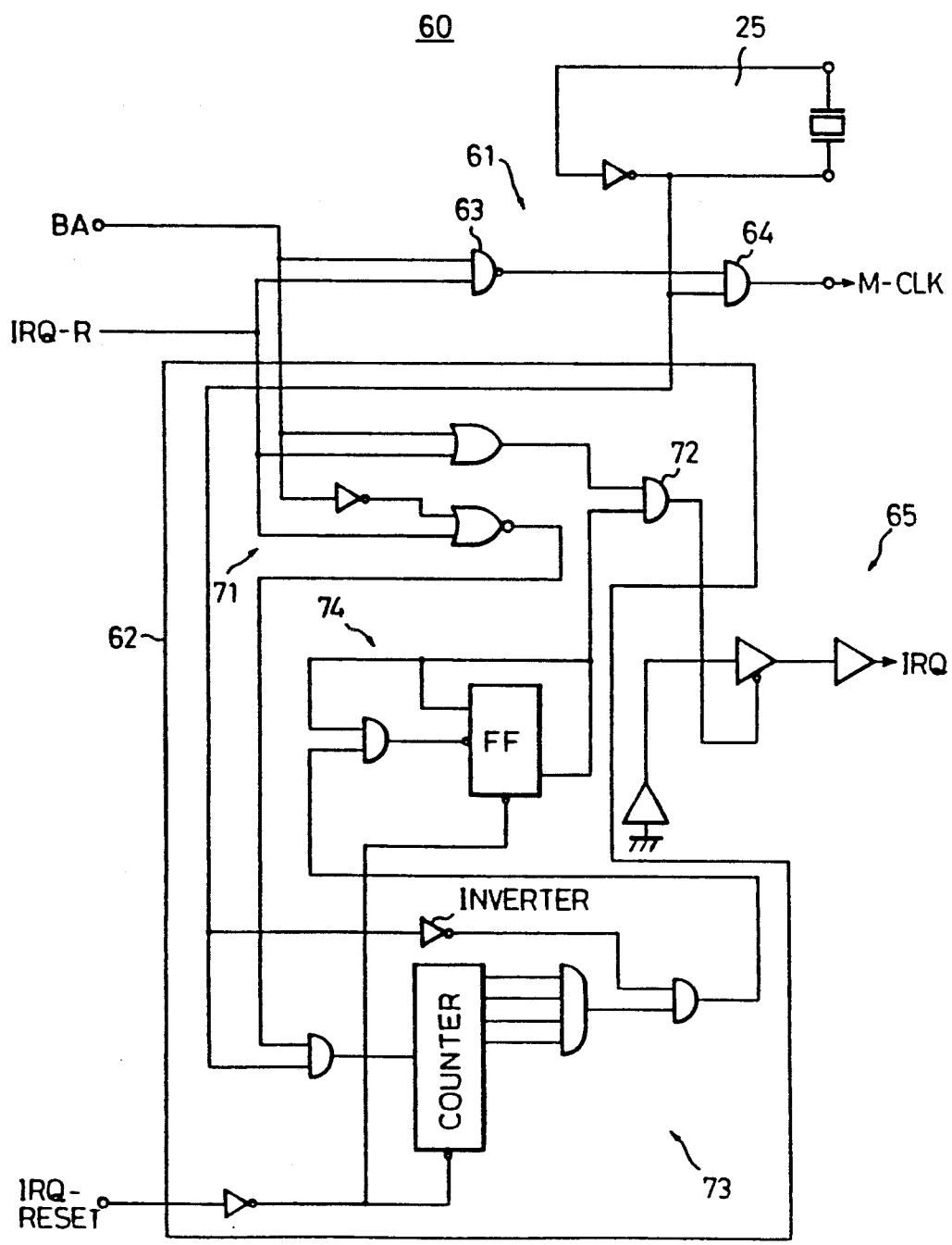
FIG. 6 is a circuit diagram of a detailed example of the timing control circuit shown in FIG. 4.

FIG. 6 is a circuit diagram of a detailed example of the timing control circuit shown in FIG. 4. The timing control circuit 60 of FIG. 4 has a construction as shown in FIG. 6 and is mounted in the logic LSI unit 12, particularly in the main LSI 21. The members identical to those of FIG. 4 are referenced by the same reference numerals and characters. The logic part 71 determines the issuance of the interrupt request IRQ via an AND gate 72. The AND gate 72 is opened after the elapse of the aforesaid delay time. The AND gate 72 receives the output from a logic part 73 via a logic part 74. The logic part 74 holds the output from the preceding logic part 73 by means of a flip-flop (FF). The logic part 73 produces the aforesaid delay time by means of a counter which receives the master clock from the clock source 25. When the higher 4 output bits in the counter all go to a logic level "H", the output of the logic part changes the status of the flip-flop (FF) in the logic part 74 to open the AND gate 72. The aforesaid counter is reset by an IRQ-RESET pulse which is generated in the main LSI 22 so as to rapidly reset the level of the IRQ line 17. If the level is maintained at "L" for a long time, it is impossible to respond to the next IRQ. Accordingly, the level of the IRQ line 17 is returned to the usual state soon after the issuance of the IRQ.

Figure 7A:
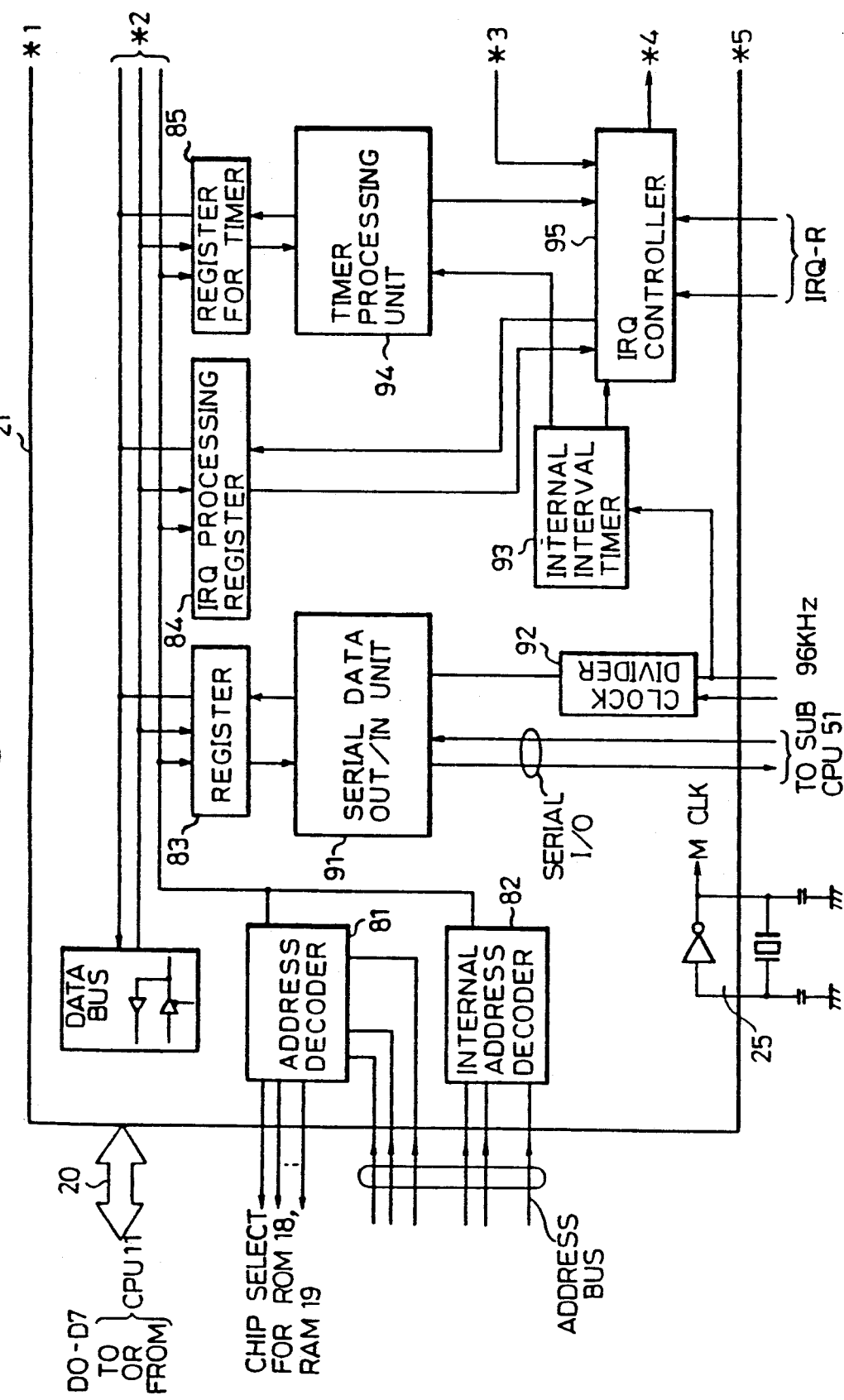
FIGS. 7A and 7B illustrate a block diagram showing a detailed example of the main LSI of FIG. 3.
Figure 7B:
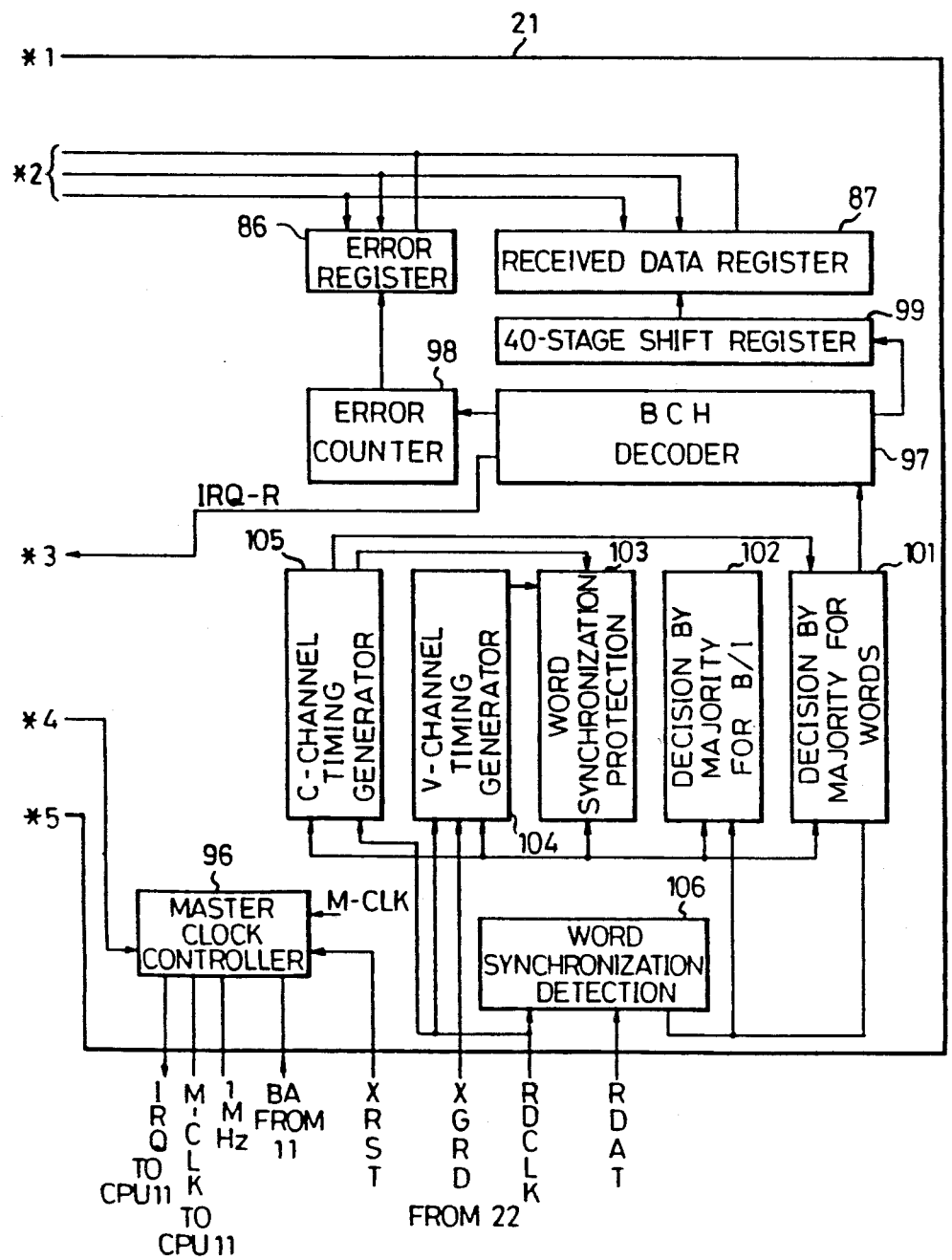

FIGS. 7A and 7B illustrate a block diagram showing a detailed example of the main LSI 21 in FIG. 3. The data bus 20 at the top left in FIG. 7A is connected by 8 data lines D0 through D7, with the processor unit (main CPU) 11. Below the data bus 20, an input address bus is shown. An internal address decoder 82 specifies internal registers 83 through 87 and also specifies, via an address decoder 81, the external memories, such as the ROM 18, the RAM 19 and so on (SUBLSI22, D-BB41). The register 83 cooperates with a serial data out/in unit 91 which handles the input data or output data to be communicated with, via the sub CPU 51, the display 52 and the key switch 53. The main LSI 21 operates at the low clock speed, for example, 96 KHz. The clock of 96 KHz is used, on one hand, after division in frequency by a clock divider 92. On the other hand, the clock of 96 KHz is used for driving an internal interval timer 93 which controls a timer processing unit 94 and an IRQ controller 95. The IRQ controller 95 also cooperates with the IRQ processing register 84 which registers what interrupt (IRQ-R) is generated. The unit 94 handles the aforesaid high speed timer management. The corresponding register 85 for the timer registers a variety of management times, written by CPU 11. The IRQ controller 95 receives a variety of interrupt IRQ-R. One important IRQ-R is given from a BCH decoder 97 (FIG. 7B) which handles the aforesaid error correction of the received data in terms of a BCH code. If the data is received, the decoder 94 sends the IRQ-R to the controller 95. Another IRQ-R is generated when, for example, a battery problem occurs.

In FIG. 7B, the above-mentioned BCH decoder 97 receives data processed by members 101 through 105 which commonly connect with a word synchronization detection unit 106. The unit 106 is provided with the received data (RDAT) and also the corresponding received clock (RCLK). The member 101 handles the aforesaid decision by majority for bits. The member 102 handles the aforementioned decision by majority for the busy/idle (B/I) bit. The member 103 is a word synchronization protection unit which determines that word synchronization is established when the synchronization is detected two times successively, and on the other hand, determines that the word synchronization is maintained until the synchronization is not detected five times successively. The members 104 and 105 are timing generators for dealing with voice (V) channel data and control (C) channel data, respectively, both channel data will be explained later.

The member 96 is a master clock controller which receives the aforesaid BA signal and sends the aforesaid interrupt request IRQ and the master clock M-CLK. The controller 96 also produces a clock of 1 MHz which is used for another purpose and does not concern the present invention.

Figure 8:
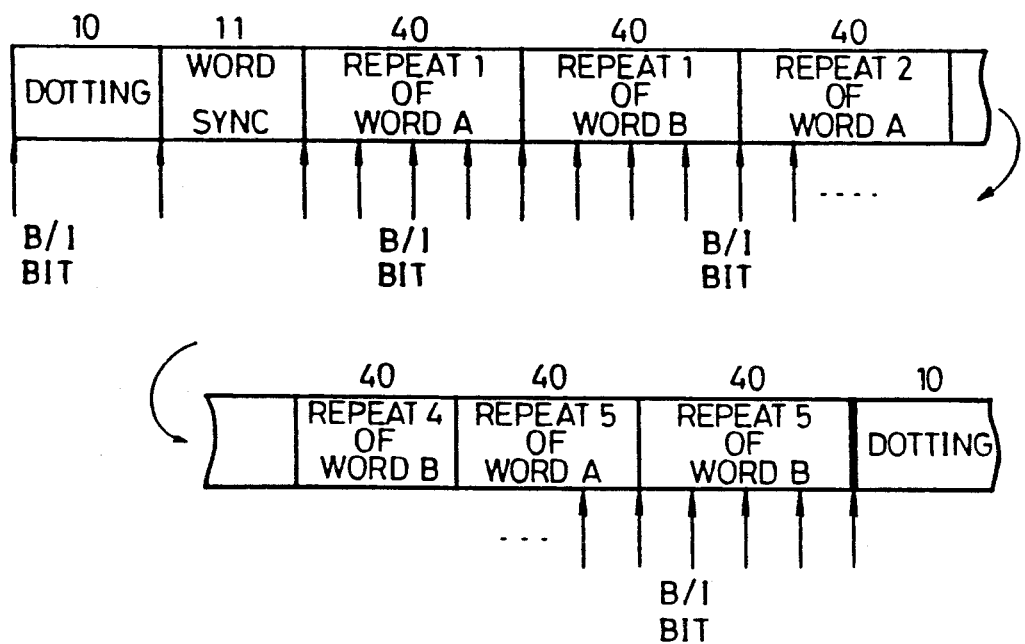
FIG. 8 illustrates a known data format of the control channel data.

FIG. 8 illustrates a known data format of the control channel data. The mobile telephone terminal is always supplied with the data of FIG. 8 from a land station when the mobile telephone terminal is put in a waiting state for transmitting data. The data has usually a speed of 10 Kbps. The mobile telephone terminal detects an existence of data by finding a dotting part composed of 10 bits having a bit pattern of "1010 . . . 10". The heading of the data is detected by a word synchronization part composed of 11 bits having a bit pattern of "11100010010". As mentioned previously, the words (40 bits) are transmitted 5 times repeatedly. In actuality, each word portion is composed of a word A part and a word B part. Either one of the words A and B is allotted to respective user in advance by contract. After the aforesaid decision by majority for the word A (or word B), the aforesaid BCH (for example (40, 28; 5)) error correction is performed by the BCH decoder (shown by 97 in FIG. 7B) to obtain 40 bit data. The numerals (40, 28; 5) mean that each word is 40 bits in length, among which 28 bits are used for inherent information, and the error correction ability is at grade 5. Thus, the correct word of 40 bits including 12 bits as parity bits is stored in a 40-stage shift register (shown by 99 in FIG. 7B) and stored in a received data register (shown by 87 in FIG. 7B). In FIG. 7B, the error detected by the BCH decoder 97 is counted by an error counter 98 and the result is stored in the error register 86. The main CPU 11 determines whether the data in the register 87 should be used or not by referring to the result in the register 86.

Figure 9:
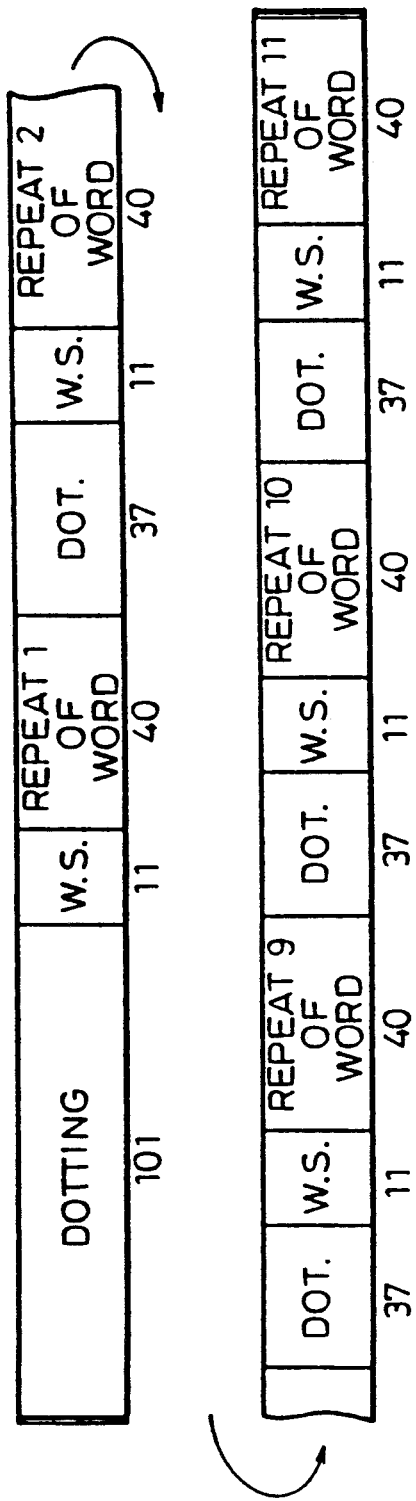
FIG. 9 illustrates a known data format of the voice channel data.

FIG. 9 illustrates a known data format of the voice channel data. The voice channel data is supplied as a burst from the land station. The data speed is 10 Kbps. In FIG. 9, "W.S." is an abbreviation of word synchronization (WORD SYNC), "DOT." refers to dotting. The bit patterns of the "DOTTING" and "WORD SYNC" are identical to those explained with reference to FIG. 8. The heading of each data portion is detected with the use of 101 bit dotting, by means of the digital base band unit (shown by 41 in FIG. 3), and the unit 41 then produces a preamble detection indicating a signal "PDI" which is sent to the sub LSI 22. The sub LSI 22 receives the PDI signal and produces a guard pulse (XGRD) to be sent to the main LSI 21. The guard pulse is 103.2 ms which corresponds to the length of each data portion. During the existence of the guard pulse, the received data "RDAT" and the received clock "RDCLK" are applied from the sub LSI 22 to the main LSI 21.

The main LSI 21 performs, when receiving the "RDAT" and "RDCLK", the decision by majority and the BCH error correction. At the end, the interrupt request IRQ is sent to the main CPU 11, as mentioned previously.

Figure 10A:
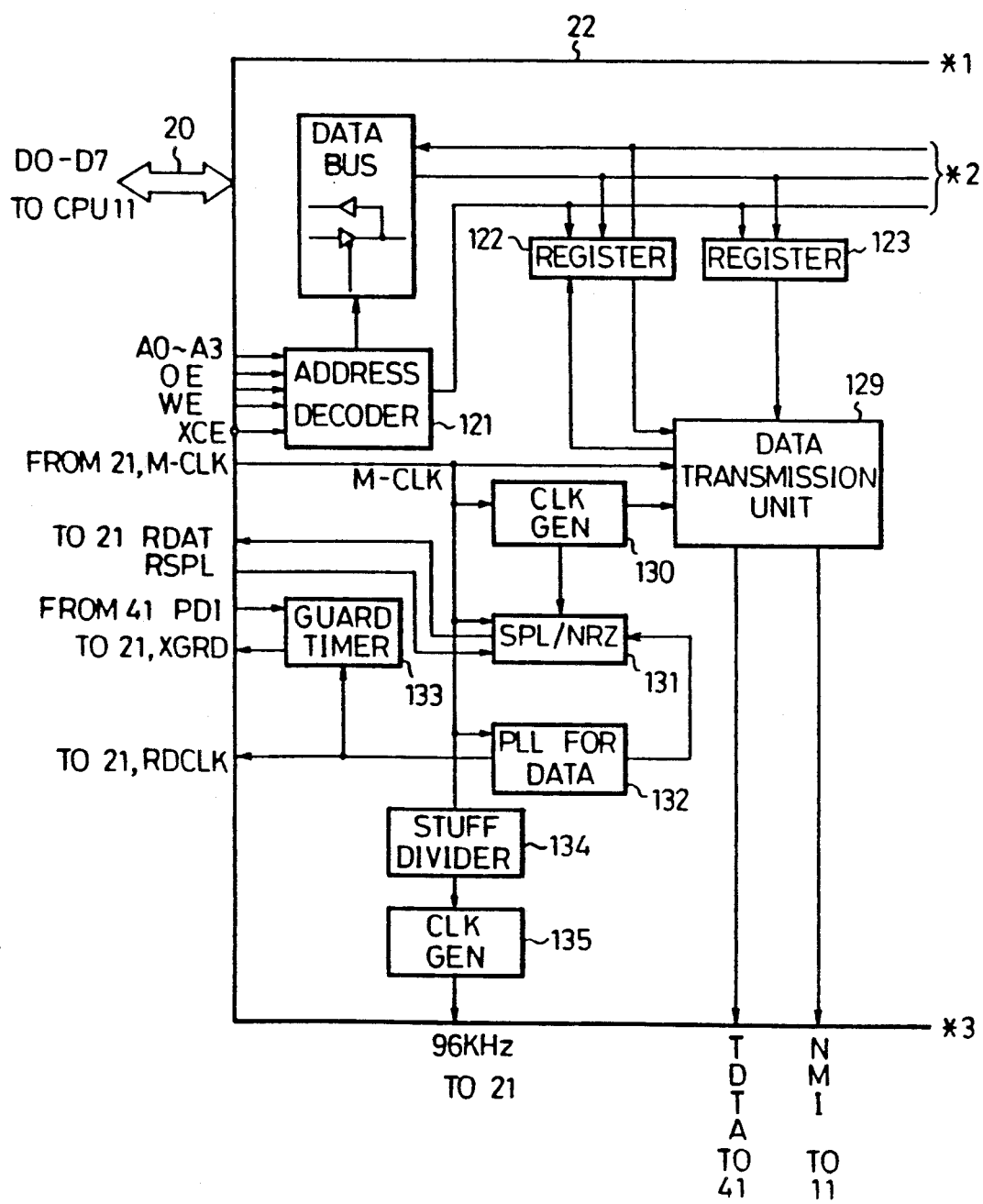
FIGS. 10A and 10B illustrate a block diagram showing a detailed example of the sub LSI of FIG. 3.
Figure 10B:
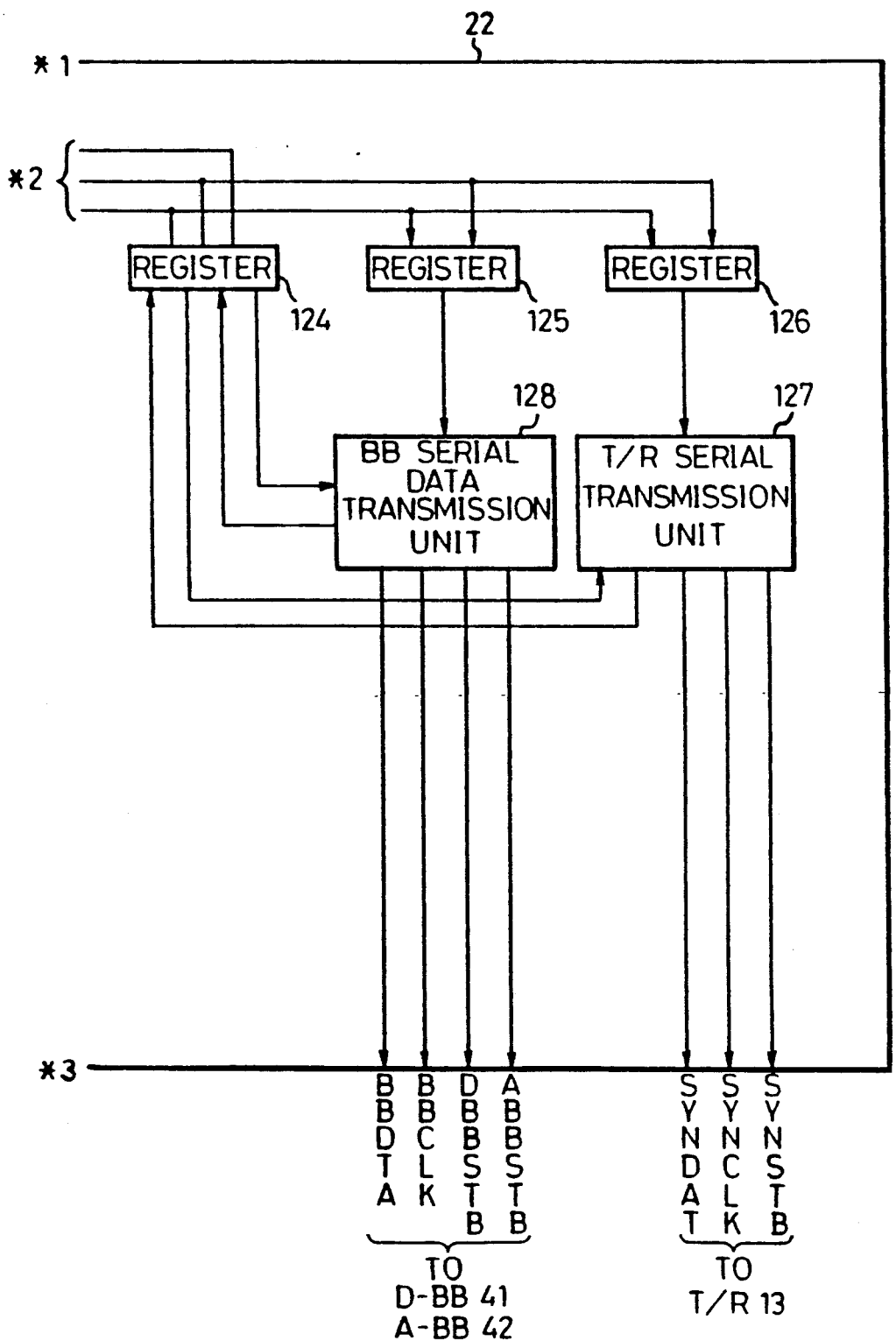

FIGS. 10A and 10B illustrate a block diagram showing a detailed example of the sub LSI of FIG. 3. The sub LSI 22 is also connected to the data bus 20 as is the main LSI 21. An address decoder 121 functions like the address decoder (shown by 82 in FIG. 7A). A0 through A3 are lower bits of the aforesaid address bus. Characters "OE", "WE" and "XCE" denote an output enable signal, a write enable signal and a chip enable signal, respectively. The address decoder 121 specifies one of the registers 122 through 126. The register 122 stores a transmission OK signal and a transmission timing signal from the CPU 11. The register 123 stores inherent data to be transmitted and received from the CPU 11. The register 124 stores control data for the digital and analog base band units 41 and 42. On the other hand, the register 125 stores data to be actually processed by these base band units 41 and 42. The register 126 stores channel selection data specified by the CPU 11. The channel selection data, i.e., tuning data, is sent to the transmitting and receiving unit (T/R) (shown by 13 in FIG. 3) via a T/R serial data transmission unit 127 which produces signals "SYNSTB" (synthesizer strobe), "SYNCLK" (synthesizer clock), and "SYNDAT" (synthesizer data).

A BB (base band) serial data transmission unit 128 cooperates with the registers 124 and 125 to produce signals "ABBSTB" (analog base band unit strobe), "DBBSTB" (digital base band unit strobe), "BBCLK" (base band unit clock) and "BBDTA" (base band unit data), which are sent to the digital and analog base band units 41 and 42.

A data transmission unit 129 cooperates with the registers 122 and 123, together with a clock generator (CLK GEN) 130 for data, to output the transmission data to the digital base band unit 41. The unit 129 also outputs a non-maskable interrupt (NMI) to the CPU 11. The NMI is different from the previously mentioned interrupt request IRQ. The NMI has the highest priority for transmitting data.

A split phase/non-return-to-zero converter (SPL/NRZ) 131 is supplied with the received split phase signal "RSPL" together with the master clock M-CLK and the clock from the generator 130. Simultaneously, the SPL/NRZ converter 131 cooperates with a phase-locked loop unit (PLL) 132 for data which produces the received data clock "RDCLK" to be sent to the main LSI 21.

The aforesaid "PDI" signal and the "XGRD" signal are treated by a guard timer 133. The aforesaid clock of 96 KHz for driving the main LSI 21 is output via a stuffing divider 134 and a clock generator (CLK GEN) 135. The divider 134 lowers the frequency of the master clock M-CLK to a certain frequency which is lowered further to obtain a 96 KHz clock signal by the generator 135.

As mentioned above in detail, the mobile telephone terminal according to the present invention is very useful for saving the power of the battery in the mobile telephone terminal and extending the life of the battery. According to an example, the current consumption, in total, of the mobile telephone terminal is reduced from 23 mA, which is a value of the prior art, to 15 mA.

I claim:

1. A mobile telephone terminal powered by a battery, comprising:
   radio means for transmitting and receiving radio frequency signals; and
   control means for performing first and second control functions, said control means including
      processor means for processing said first control functions in response to an activation signal, said processor means includes means for placing said processor means into a holding state when said processor means finishes processing said first control functions; and
      logic means for processing said second control functions and for providing said activation signal to said processor means when first control functions need to be processed, said logic means includes clock providing means for selectively providing a high speed clock signal to said processor means based on said holding state and blocking means for blocking said high speed clock signal from said processor means when said processor means is in said holding state.

2. A mobile telephone terminal as set forth in claim 1, wherein said logic means includes:
   receiving means for receiving a logic signal having a first state when said processor means is in said holding state and a second state when said processor means is in an operating state.

3. A mobile telephone terminal as set forth in claim 1, wherein said means for placing said processor means into said holding state includes:
   means for executing a "Wait for Interrupt" instruction.

4. A mobile telephone terminal as set forth in claim 3, wherein said logic means includes:
   means for issuing an interrupt request to said processor means if an interrupt occurs in said logic means, said interrupt occurs when said first control functions need to be processed.

5. A mobile telephone terminal as set forth in claim 4, wherein said processor means includes:
   a read only memory for storing a program to operate said processor unit, said program is subject to external commands issued from said logic means.

6. A mobile telephone terminal as set forth in claim 4, wherein said means for issuing said interrupt request includes:
   immediate interrupt means for issuing said interrupt request immediately after the occurrence of said interrupt if said interrupt occurs when said logic signal is in said second state.

7. A mobile telephone terminal as set forth in claim 4, wherein said means for issuing said interrupt request includes:
   delayed interrupt means for issuing said interrupt request after a predetermined delay time from the occurrence of said interrupt if said interrupt occurs when logic signal is in said first state.

8. A mobile telephone terminal as set forth in claim 7, wherein said predetermined delay time is a time required for said clock providing means to provide said high speed clock signal.

9. A mobile telephone terminal as set forth in claim 8, wherein said clock providing means includes:
   means for obtaining said high speed clock signal by frequency dividing a master clock signal provided from a master clock; and said logic means includes:
   a delay means for providing said predetermined delay time.

10. A mobile telephone terminal as set forth in claim 9, wherein said clock providing means further includes:
    first logic means, responsive to said logic signal and said interrupt, for providing said master clock signal regardless of the existence of an interrupt when said logic signal is in said second state, and for providing said master clock signal at the occurrence of said interrupt when said logic signal is in said first state.

11. A mobile telephone terminal as set forth in claim 9, wherein said means for issuing said interrupt request further includes:
    second logic means, responsive to said logic signal and said interrupt, for producing said interrupt request immediately after said interrupt when said logic signal is in said second state, and for producing an interrupt request after said predetermined delay time when said logic signal is in said first state.

12. A mobile telephone terminal as set forth in claim 1, wherein said processor means includes:
    means for executing terminal control, data transmission processing, and low speed timer management; said logic means including:
    means for executing said data reception processing and high speed timer management.

13. A mobile telephone terminal as set forth in claim 12, wherein said processor means includes:
    means for controlling at least call origination, call termination and registration of the location of the mobile telephone terminal.

14. A mobile telephone terminal as set forth in claim 12, wherein said logic means includes:
    means for executing word synchronization of received data, for executing a decision by majority for words transmitted repeatedly as said received data so that non-normal bits of the words are corrected based on the majority of the bits, for executing a decision by majority for busy/idle indication bits so that the busy/idle state is determined based on the majority of the busy/idle indication bits, and for executing error correction of said received data in terms of a Bose-Chaudhuri-Hocqueghem code.

15. A mobile telephone terminal as set forth in claim 1, wherein at least one of said processor means and said logic means includes a CMOS device.

16. A mobile telephone terminal as set forth in claim 1, wherein said first control functions include control functions that are used infrequently and operate at a high clock speed.

17. A mobile telephone terminal powered by a battery, comprising:

radio means for transmitting and receiving radio frequency signals; and control means for performing first control functions, and for processing second control functions, at least one of said first and second control functions include functions for controlling said radio means; said control means includes:

processor means for processing said first control functions in response to an activation signal and for entering a holding state when said processing means finishes processing said first control functions; and logic means for processing said second control functions, for providing said activation signal and a high speed clock signal to said processing means when said first control functions are to be processed, and for blocking said high speed clock signal from said processing means when said processing means is in said holding state.

18. A method of controlling a battery powered mobile telephone terminal, including a radio unit for transmitting and receiving radio frequency signals and a control unit for performing control functions, said control unit includes a processor unit and a logic unit, comprising the steps of:

(a) defining first control functions;
(b) defining second control functions;
(c) processing said second control functions in the logic unit;
(d) determining if said first control signals are to be processed;
(e) activating the processor unit and providing a high speed clock signal to the processor unit in response to the determination that said first control signals are to be processed;
(f) processing said first control signals in the processor unit in response to the activation of the processor unit; and
(g) switching said processor unit into a holding state and blocking said high speed clock signal from the processor unit in response to the determination that said first control signals are not to be processed.

* * * * *

UNITED STATES PATENT AND TRADEMARK OFFICE
CERTIFICATE OF CORRECTION

PATENT NO. : 5,058,203

DATED : October 15, 1991

INVENTOR(S) : FUJIO INAGAMI et al.

It is certified that error appears in the above-identified patent and that said Letters Patent is hereby corrected as shown below:

| | | |
|---|---|---|
| Col. 1, | line 44, | "an operating of keys" should be --operating keys--. |
| Col. 11, | line 23, | "means for" should be --means operatively connected to said radio means for--; |
| | line 48, | "claim 1," should be --claim 2,--. |
| Col. 12, | line 45, | "said" should be deleted; |
| | line 55, | "executing a decision by majority" should be --correcting non-normal bits of--; |
| | line 56, | "for" should be deleted; |
| | line 57, | "so that non-normal bits of words are cor-" should be deleted; |
| | line 58, | "rected" should be deleted, |
| | | ",for execut-" should be --of said words, for determining a--; |
| | line 59, | "ing a decision by majority for busy/idle indication" should be deleted; |
| | line 60, | "bits so that the" should be deleted, |
| | | "is determined" should be deleted. |

UNITED STATES PATENT AND TRADEMARK OFFICE
CERTIFICATE OF CORRECTION

PATENT NO. : 5,058,203
DATED : October 15, 1991
INVENTOR(S) : Fujio Inagami et al It is certified that error appears in the above-identified patent and that said Letters Patent is hereby corrected as shown below:

Col. 13, line 1, "at a" should be --based upon said--;
        line 2, "clock speed" should be --speed clock signal--;
        line 13, "processor" should be --processing--.

Signed and Sealed this

Sixth Day of April, 1993

Attest:

STEPHEN G. KUNIN

Attesting Officer      Acting Commissioner of Patents and Trademarks